(12) United States Patent
Daum (10) Patent No.: US 8,638,702 B2
(45) Date of Patent: Jan. 28, 2014

(54) METHOD AND SYSTEM FOR TIME BASED WLAN SCANNING

(75) Inventor: Daniel Daum, Chapel Hill, NC (US)

(73) Assignee: Broadcom Corporation, Irvine, CA (US)

( * ) Notice: Subject to any disclaimer, the term of this patent is extended or adjusted under 35 U.S.C. 154(b) by 554 days.

(21) Appl. No.: 12/355,015

(22) Filed: Jan. 16, 2009

(65) Prior Publication Data

US 2010/0150118 A1 Jun. 17, 2010

Related U.S. Application Data

(60) Provisional application No. 61/122,123, filed on Dec. 12, 2008.

(51) Int. Cl.
*G08C 17/00* (2006.01)

(52) U.S. Cl.
USPC ............................................ 370/311; 370/328

(58) Field of Classification Search
USPC .................................................. 370/310–350
See application file for complete search history.

(56) References Cited

U.S. PATENT DOCUMENTS

| | | | | |
|---|---|---|---|---|
| 7,948,939 B2 * | 5/2011 | Sugaya et al. | ................ | 370/329 |
| 2005/0128988 A1 * | 6/2005 | Simpson et al. | ............... | 370/338 |
| 2006/0270438 A1 * | 11/2006 | Choi | .............................. | 455/522 |
| 2007/0010261 A1 * | 1/2007 | Dravida et al. | ............ | 455/456.3 |
| 2008/0057912 A1 * | 3/2008 | Deprun | ........................ | 455/413 |

* cited by examiner

*Primary Examiner* — Andrew Chriss
*Assistant Examiner* — Kenan Cehic
(74) *Attorney, Agent, or Firm* — Garlick & Markison; Edward J. Marshall (57) ABSTRACT

Certain aspects of a method and system for time based wireless local area network (WLAN) scanning may include controlling scanning of a plurality of wireless access points in one or more WLANs by a WLAN station based on one or more factors comprising power consumed by the WLAN station based on the scanning, and/or a priority level of one or more media packets to be handled by the WLAN station. The information may be acquired for one or more of the plurality of wireless access points in one or more WLANs during the controlled scanning.

21 Claims, 5 Drawing Sheets

FIG. 5

METHOD AND SYSTEM FOR TIME BASED WLAN SCANNING

CROSS-REFERENCE TO RELATED APPLICATIONS/INCORPORATION BY REFERENCE

This application makes reference to, claims priority to, and claims the benefit of U.S. provisional application Ser. No. 61/122,123 filed on Dec. 12, 2008.

The above stated application is hereby incorporated by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to wireless communication. More specifically, certain embodiments of the invention relate to a method and system for time based wireless local area network (WLAN) scanning.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

As the number of electronic devices enabled for wired and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Wireless local area network (WLAN) radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users. Multiple active users may also result in significant interference between operating devices. Moreover, in some instances, microwave ovens may also operate in this frequency spectrum and may produce significant interference or blocking signals that may affect WLAN transmissions.

The devices using the IEEE 802.11 physical layer (PHY) and medium access control (MAC) layer may be referred to as stations or access points, for example. The access points may enable distribution of data between endpoints. The MAC may also provide control frames for power management and time synchronization, for example. The access points may provide a time synchronization beacon to associated stations in an infrastructure basic service set (BSS). In an independent BSS, where stations are operating as peers, an algorithm may be defined that may enable each station to reset its time when it receives a synchronization value greater than its current value. The stations entering a power-saving mode may inform a WLAN device through the frame control field of a message, for example. The access point may then buffer transmissions to the station. A station may wake up periodically to receive beacon frames and be informed that it has buffered transmissions waiting and then request transmission. A station in active mode may be enabled to receive frames at any time during a contention-free period. On the other hand, a station in a power-save mode may periodically enter the active mode to receive beacons, broadcast, multicast, and buffered data frames.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for time based wireless local area network (WLAN) scanning, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of a method and system for time based wireless local area network (WLAN) scanning comprises controlling scanning of a plurality of wireless access points in one or more WLANs by a WLAN station based on one or more factors comprising power consumed by the WLAN station based on the scanning, and/or a priority level of one or more media packets to be handled by the WLAN station. The information may be acquired for one or more of the plurality of wireless access points in one or more WLANs during the controlled scanning.

Figure 1:
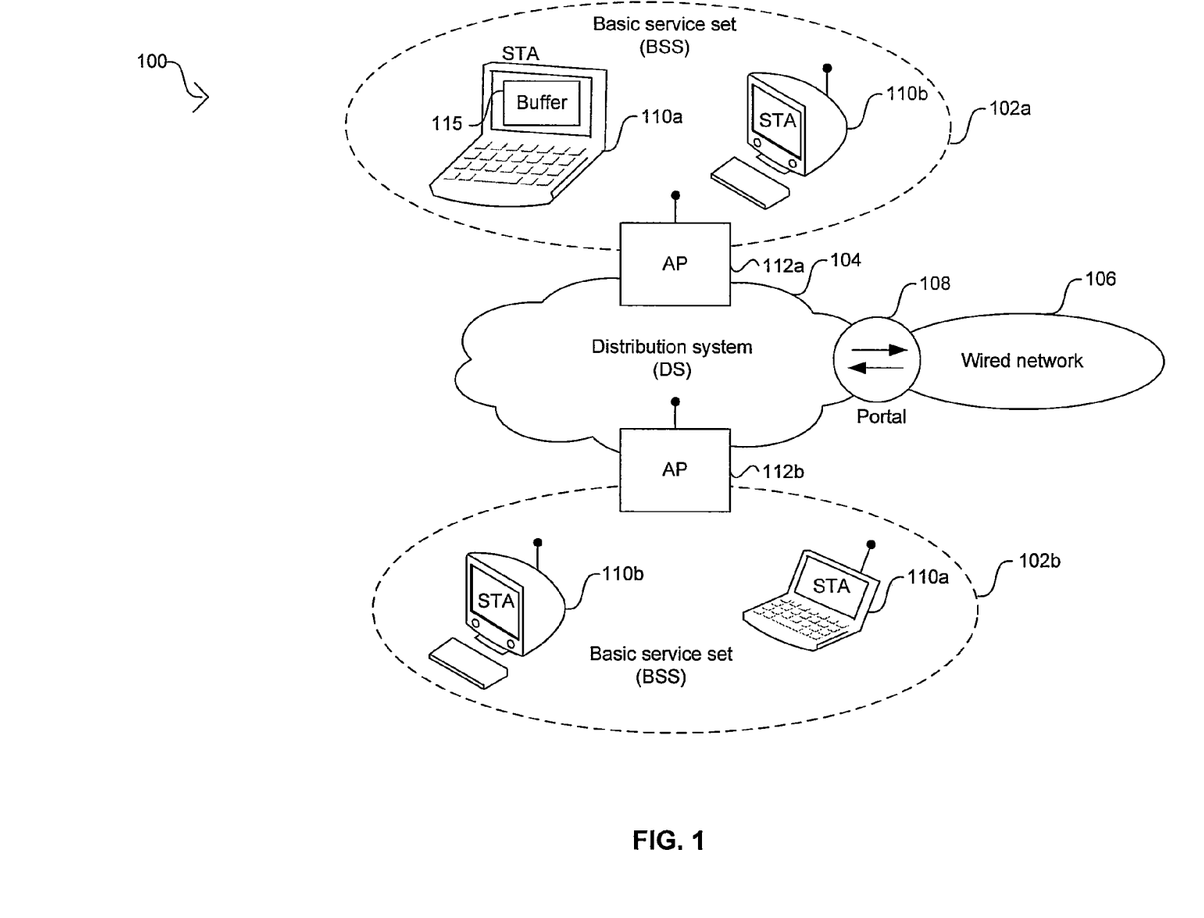
FIG. 1 is a block diagram of an exemplary WLAN infrastructure network comprising basic service sets (BSSs) integrated using a common distribution system (DS), in accordance with an embodiment of the invention.

FIG. 1 is a block diagram of an exemplary WLAN infrastructure network comprising basic service sets (BSSs) integrated using a common distribution system (DS), in accordance with an embodiment of the invention. Referring to FIG. 1, the exemplary WLAN infrastructure network 100 shown may comprise a first BSS 102a, a second BSS 102b, a DS 104, a wired network 106, a portal 108, a first wireless access point (WAP) 112a, a second WAP 112b, and a plurality of WLAN stations (STAs). The BSSs 102a and 102b may represent a fundamental building block of the IEEE 802.11 (WLAN) architecture and may be defined as a group of stations (STAs) that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be enabled to operate as a backbone network that is responsible for Medium Access Control (MAC) level transport in the WLAN infrastructure network 100. The DS 104, as specified by the IEEE 802.11 standard, is implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 is logically different from the BSSs and may be utilized only to transfer packets between the BSSs and/or to transfer packets between the BSSs and the wired network 106.

The wired network 106 may comprise suitable hardware, logic, circuitry, and/or code that may be enabled to provide wired networking operations. The wired network 106 may be accessed from the WLAN infrastructure network 100 via the portal 108. The portal 108 may comprise suitable hardware, logic, circuitry, and/or code and may be enabled to integrate the WLAN infrastructure network 100 with non-IEEE 802.11 networks. Moreover, the portal 108 may also be enabled to perform the functional operations of a bridge, such as range extension and/or translation between different frame formats, in order to integrate the WLAN infrastructure network 100 with IEEE 802.11-based networks.

The WAPs 112a and 112b may comprise suitable hardware, logic, circuitry, and/or code that may be enabled to support range extension of the WLAN infrastructure network 100 by providing the integration points necessary for network connectivity between the BSSs. The STA 110a and the STA 110b correspond to WLAN-enabled terminals that comprise suitable hardware, logic, circuitry, and/or code that may be enabled to provide connectivity to the WLAN infrastructure network 100 via the WAPs. In an exemplary embodiment of the invention, the STA 110a shown comprises a laptop computer and may correspond to a mobile station or terminal within the BSS and the STA 110b shown is a desktop computer and may correspond to a fixed or stationary terminal within the BSS. Each BSS may comprise a plurality of mobile or fixed stations and may not be limited to the exemplary implementation shown in FIG. 1A.

In accordance with an embodiment of the invention, the WAP 112a may be enabled to communicate information regarding neighbor candidate WAPs, for example, WAP 112b to a STA, for example, the STA 110a. The STA 110a may then utilize the information to schedule its tuning to a target frequency and execute identification and signal measurements for the target WAP in a minimum amount of time. The information may comprise, for example, beacon intervals or the periodicity of occurrence of beacon frames, a targeted beacon frame transmit time, or contention-free and contention-based periods, for example. The information may be communicated to the STA 110a in an absolute time reference or a relative time difference to a known reference, for example. The information for neighbor candidate WAPs, for example, the WAP 112b may be communicated to STAs, for example, STA 110a using solicited and/or unsolicited broadcast/multicast-type frames, for example, included in a beacon frame, or solicited and/or unsolicited unicast-type MAC frames, for example, in association response frames, reassociation response frames, or probe response frames. The information elements (IE) comprising information may be communicated in or as part of MAC management frames or may be piggybacked onto MAC control or data frames, for example. The information of neighbor candidate WAPs, for example, WAP 112b may be generated in a particular WAP, for example, WAP 112a by several methods. For example, the WAP 112a may utilize network side signaling to retrieve information of neighboring WAPs, the WAP 112a may utilize its own measurements of neighbor WAPs, the WAP 112a may utilize reports from STA measurements, or the WAP 112a may utilize a generic timing device on the network.

In network side signaling, the WAPs 112a and 112b may exchange information regarding the transmission time of their beacons through the distribution system 104 connecting the WAPs 112 and 112b together. There may be several possible implementations for network side signaling. For example, the WAP 112a may broadcast information regarding the timing of its beacon transmissions to all WAPs over the distribution system 104, or the WAP 112a may request beacon information from another WAP, for example, WAP 112b which may respond through the distribution system 104. Alternatively, the WAP 112a may be enabled to query a network timing database, such as a central remote or local network management entity to obtain current information about its neighboring WAPs, for example, the WAP 112b.

When the WAP 112a uses its own measurements of neighbor WAPs, the measuring WAP 112a may listen to the beacons of other WAPs, for example, WAP 112b and measure the transmission time of the beacons. Based on the beacon transmission interval, the measuring WAP 112a may infer approximate future transmission times, for example. In one embodiment of the invention, the neighboring WAPs, for example, the WAP 112b may use the same frequency channel as the measuring WAP 112a, for example. In another embodiment of the invention, the measuring WAP 112a may be enabled to tune to other frequency channels from time to time so that the WAP 112a may listen to the beacons.

In accordance with an embodiment of the invention, the STAs, for example, STA 110a may report to the coordinating WAP 112a, the times at which the STA 110a receives a beacon frame from neighboring WAPs along with beacon transmission intervals, the identity of the neighboring WAPs, for example, WAP 112b and a timestamp of the neighboring WAP, for example, WAP 112b. The coordinating WAP 112a may be enabled to utilize this combination of absolute and/or relative time references to derive the information. The coordinating WAP 112a may store this information in memory and infer approximate future transmission times of the beacon for these WAPs.

When a STA 110a enters the BSS 102a, the STA 110a may be enabled to set a flag in the association request frame, in the reassociation request frame, or in the probe request frame. The flag may be utilized to indicate that the STA 110a wants to receive a neighbor WAP report element in the corresponding association response frame, reassociation response frame, or probe response frame, for example. The flag may be implemented in various ways, for example, as a bit flag or as an information element comprising multiple values indicating the type of information the STA 110a desires to retrieve from the WAP 112a. The neighbor WAP report element may include a timing synchronization function (TSF) information field, which may include a TSF offset value and a beacon interval value for the neighbor WAP, for example, WAP 112b. The TSF offset value may be expressed in timing units (TUs), which may be, for example and without loss of generality one microsecond in length, for example, and may be the timing offset between the coordinating WAP 112a and the neighbor WAP, for example, WAP 112b expressed in TUs relative to the coordinating WAP 112a. The beacon interval value may be expressed as a target beacon transmission time (TBTT), with a default value of 100 ms, for example. Notwithstanding, the invention may not be so limited and other suitable values may be utilized for the TBTT without limiting the scope of the invention.

The WLAN station, STA 110a may be operable to scan a plurality of access points, for example, 112a and 112b associated with the WLAN station, STA 110a for a set time period to acquire information of the plurality of access points 112a and 112b. The WLAN station, STA 110a may be operable to determine the power consumed by the WLAN station, STA 110a based on the scanning, and/or a priority level of one or more media packets to be transmitted by the WLAN station, STA 110a. The WLAN station, STA 110a may be operable to suspend the scanning of the plurality of access points, 112a and 112b based on the power consumed by the WLAN station, STA 110a based on the scanning, and/or the priority level of one or more media packets to be transmitted by the WLAN station, STA 110a.

The acquired information may comprise a duration, a source address, a destination address, a basic service set ID (BSSID), a timestamp, a beacon interval, a service set ID (SSID), supported rates, frequency hopping parameters, direct sequence spread spectrum parameters, contention free (CF) parameters, independent basic service set (IBSS) parameters, and/or setup configuration protocol (SP) information of a beacon frame received from the plurality of access points, 112a and 112b.

Figure 2:
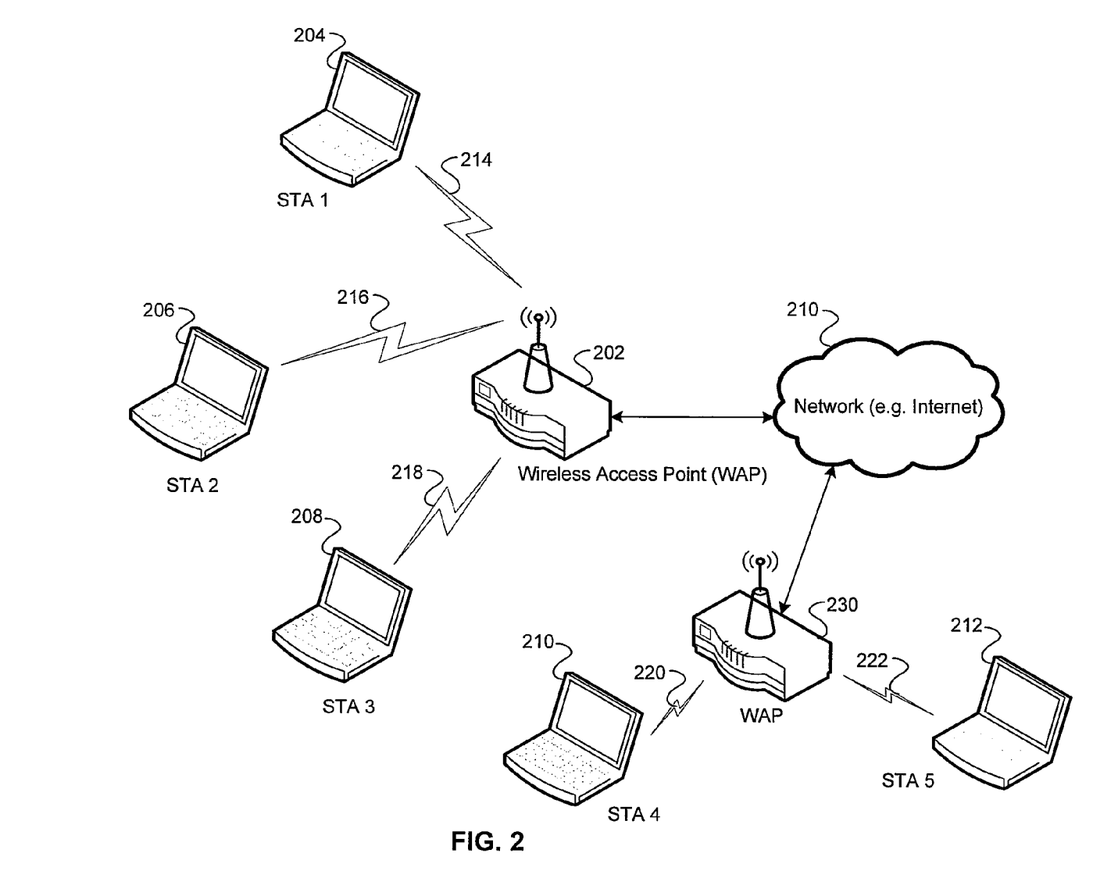
FIG. 2 is a block diagram of an exemplary wireless network, in accordance with an embodiment of the invention.

FIG. 2 is a block diagram of an exemplary wireless network, in accordance with an embodiment of the invention. Referring to FIG. 2, there is shown a plurality of wireless access points (WAPs) 202 and 230, a plurality of WLAN stations (STA), for example, STA 1 204, STA 2 206, STA 3 208, STA 4 210 and STA 5 212, a plurality of RF channels 214, 216, 218, 220 and 222, and a network 210. Each of the plurality of WLAN STAs, STA 1 204, STA 2 206, STA 3 208, STA 4 210 and STA 5 212 may be a wireless terminal such as a PC, a laptop, or a PDA with integrated or plug-in 801.11 capabilities. For example, the PC may utilize a wireless NIC card and the laptop or PDA may comprise integrated 801.11 capabilities. The network 210 may be a private or public network, for example, a service provider or the Internet.

In operation, in instances where the WLAN STAs, STA 1 204, STA 2 206, STA 3 208, STA 4 210 and/or STA 5 212 are configured, they may communicate with the WAPs 202 and 204 via corresponding secure RF channels 214, 216, 218, 220 and 222 respectively. The WAP 202 may communicate information received from configured WLAN STAs, STA 1 204, STA 2 206 and/or STA 3 208 via the network 210. The WAP 230 may communicate information received from configured WLAN STAs, STA 4 210 and/or STA 5 212 via the network 210. In instances where the WLAN STAs, STA 1 204, STA 2 206, STA 3 208, STA 4 210 and/or STA 5 212 are unconfigured, they may communicate with the WAPs 2 02 and 230 functioning as configurators to request configuration information. The WAPs 202 and 230 functioning as configurators may configure requesting WLAN STAs, STA 1 204, STA 2 206, STA 3 208, STA 4 210 and STA 5 212 via a corresponding RF channel 214, 216, 218, 220 or 222 respectively.

In accordance with an embodiment of the invention, each of the WLAN STAs, for example, STA 1 204 may be operable to scan a plurality of WAPs, for example, WAP 202 and WAP 230 for a set time period to acquire information of the plurality of WAPs 202 and 230. The acquired information may be stored in the buffer 115.

Figure 3:
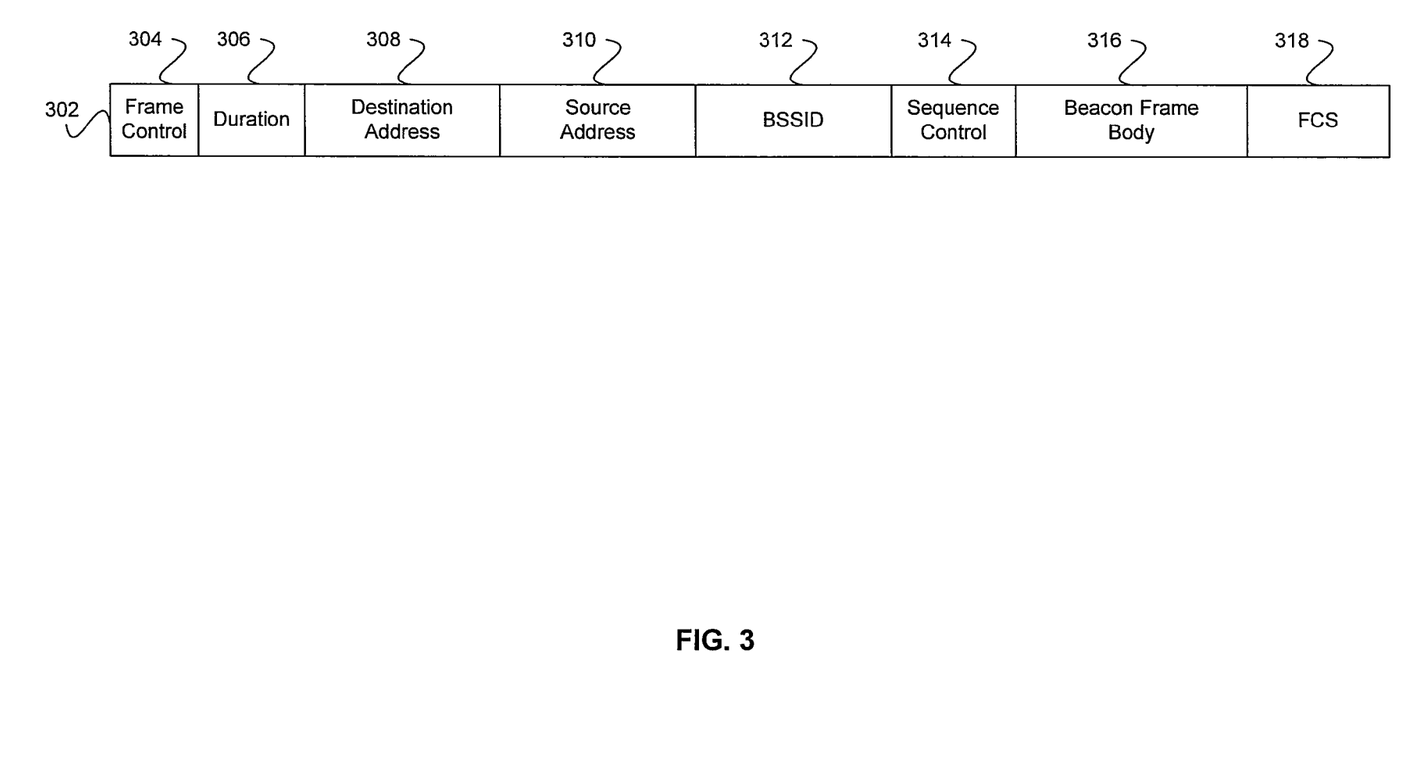
FIG. 3 is a diagram of an exemplary beacon frame format, in accordance with an embodiment of the invention.

FIG. 3 is a diagram of an exemplary beacon frame format, in accordance with an embodiment of the invention. With reference to FIG. 3, there is shown a beacon frame format 302 with a time period, Tf equal to 10 ms, for example. The beacon frame 302 may comprise a frame control field 304, a duration field 306, a destination address field 308, a source address field 310, a BSSID field 312, a sequence control field 314, a beacon frame body 316, and a frame check sequence (FCS) 318. The format of the beacon frame may be based on specifications contained in IEEE standard 802.11.

The frame control field 304 may comprise information that identifies the frame as being a beacon frame. The duration field 306 may comprise information indicating the amount of time that is to be allocated for transmitting the beacon frame 302 and for receiving an acknowledgement of transmission. The destination address field 308 may comprise information identifying an address of one or more stations, such as, for example, client station 254, that are intended to receive the beacon frame 302. The source address field 310 may comprise information identifying the address of the station that transmitted the beacon frame 302. The BSSID field 312 may comprise information identifying the address of an WAP that is a current member of the basic service set (BSS), such as, for example BSS 202. The sequence control field 314 may be utilized to identify a beacon frame that may be a segment within a larger protocol data unit (PDU). The beacon frame body 316 may comprise information that is specific to a beacon frame. The frame check sequence (FCS) field 318 may be utilized to detect errors in a received beacon frame 302.

In operation, the beacon frame 302 may be communicated by a WAP, such as, for example, WAP 202, in a BSS, such as, for example, BSS 102a. The beacon frame may enable stations within a BSS to locate a WAP within the ESS. A station that is not a current member of the BSS may establish an association with the WAP based on the BSSID field.

In accordance with an embodiment of the invention, information may be acquired for one or more of the plurality of wireless access points in one or more WLANs during the controlled scanning. The acquired information may comprise a duration 306, a source address 310, a destination address 308, a basic service set ID (BSSID) 312, a frame control field 304, a sequence control field 314, and a frame check sum (FCS) 318a.

Figure 4:
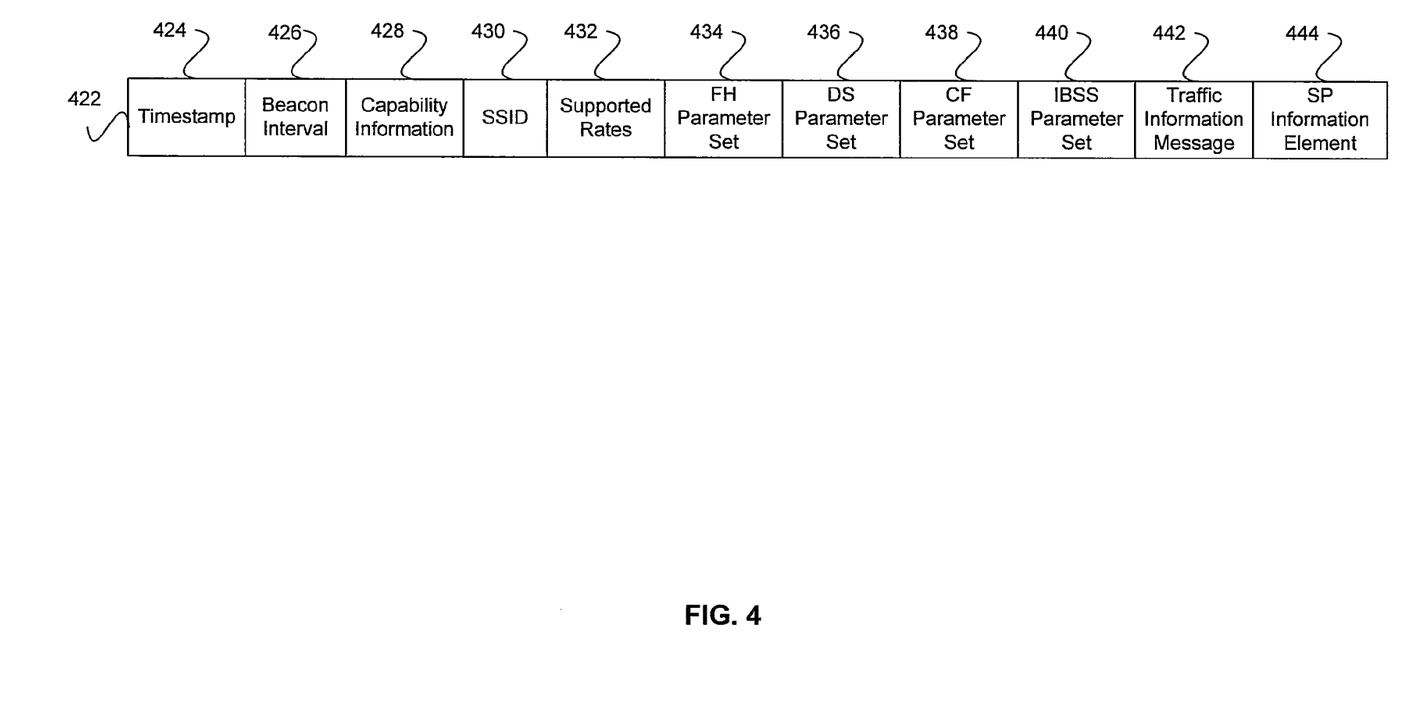
FIG. 4 is a diagram of an exemplary beacon frame body format, in accordance with an embodiment of the invention.

FIG. 4 is a diagram of an exemplary beacon frame body format, in accordance with an embodiment of the invention.

With reference to FIG. 4, there is shown a beacon frame body format 422. The beacon frame body format 422 may comprise a timestamp field 424, a beacon interval field 426, a capability information field 428, a SSID field 430, a supported rates field 432, a frequency hopping (FH) parameter set field 434, a direct sequence spread spectrum parameter set field 436, a contention free (CF) parameter set field 438, an independent BSS (IBSS) parameter set field 440, a traffic information message field 442, and a setup configuration protocol (SP) information element (IE) field 444.

The timestamp field 424 may indicate a time at which the beacon frame was transmitted. The beacon interval field 426 may indicate the amount of time that may transpire between beacon frame transmissions. The capability information field 428 may be used to communicate capabilities related to a station, such as, for example, client station 204 that transmits the beacon frame. The SSID field 430 may identify ESS membership information of the station, such as, for example, client station 204, transmitting the beacon. The supported rates field 432 may indicate data rates that may be supported by the station that transmitted the beacon frame. The FH parameter set field 434 may comprise information about stations that utilize frequency hopping. The DH parameter set field 436 may comprise information about stations that utilize direct sequence spread spectrum. The CF parameter set field 438 may comprise information about WAPs, such as, for example, WAP 202 that support contention free polling of stations in a BSS such as, for example, BSS 102a. The IBSS parameter set 440 may comprise information about stations that are members of an IBSS that do not comprise a WAP and do not access stations outside of the BSS via a DS such as, for example, DS 210. The SP IE field 444 may comprise authorization enablement information that is utilized by a configuration protocol.

In operation, a configurator, such as, for example, WAP 202 functioning as a configurator station 202 may transmit a beacon frame comprising the SP information element field 444. A station within a BSS may identify a configurator based on the source address field 310 of the beacon frame, and based upon the presence of a SP information element 444 in the beacon frame body 316. The SP information element may comprise information that is not specified in IEEE standard 802.11. Ethernet frames that comprise the SP information element may be identified based on the Ethertype field in the Ethernet frame header, where the Ethernet frame header may be as specified in IEEE 802.

In accordance with an embodiment of the invention, the acquired information may comprise a timestamp 424, a beacon interval 426, a service set ID (SSID) 430, capability information 428, supported rates 432, frequency hopping parameters 434, direct sequence spread spectrum parameters 436, contention free (CF) parameters 438, independent basic service set (IBSS) parameters 440, traffic information message 442 and/or setup configuration protocol (SP) information 444 of a beacon frame 302 received from the plurality of WAPs 202 and 230.

Figure 5:
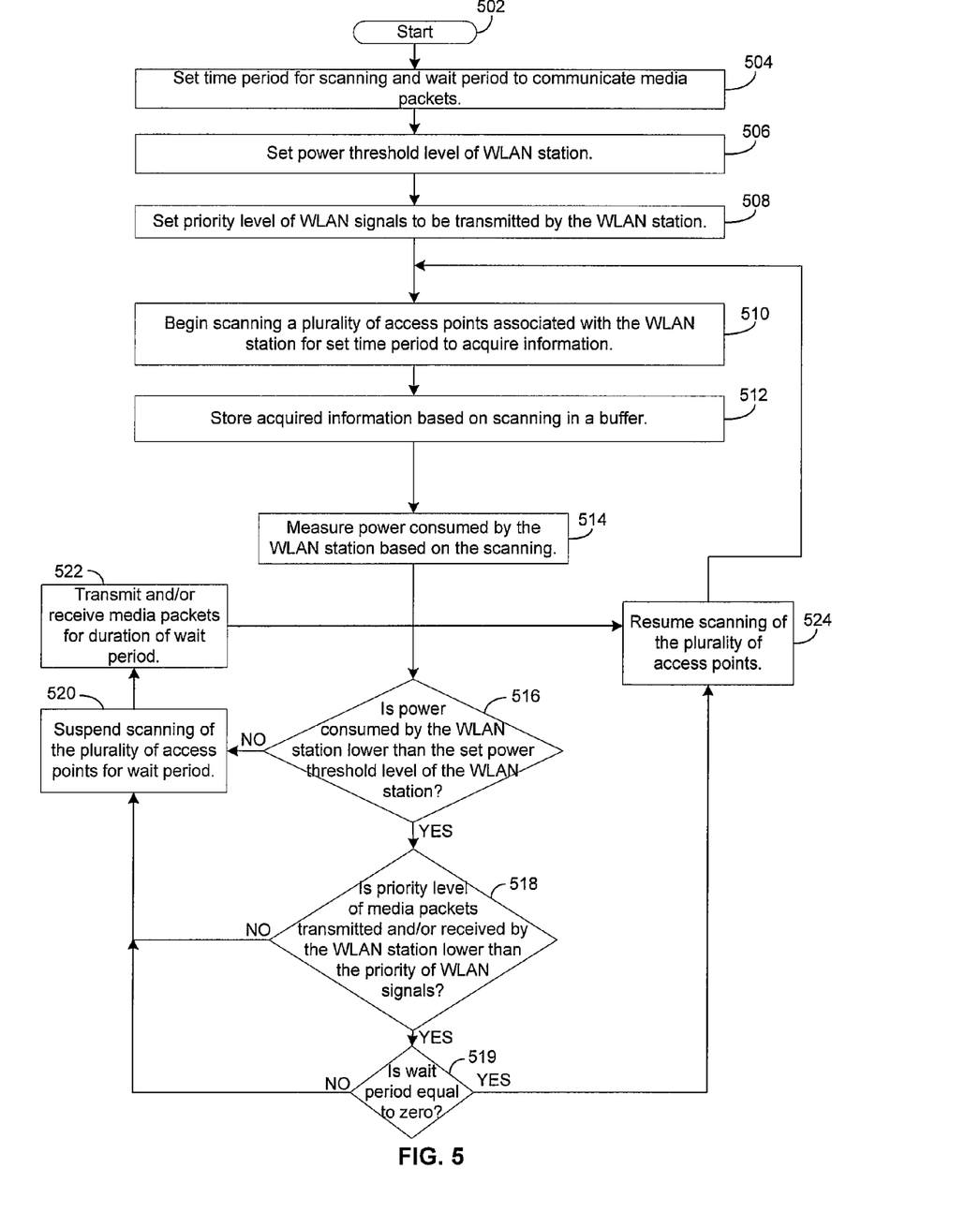
FIG. 5 is a flow chart illustrating exemplary steps for time based WLAN scanning, in accordance with an embodiment of the invention.

FIG. 5 is a flow chart illustrating exemplary steps for time based WLAN scanning, in accordance with an embodiment of the invention. Referring to FIG. 5, exemplary steps may begin at start step 502. In step 504, a time period for scanning of the plurality of access points and a wait period to allow media packets to be communicated may be set. In step 506, a power threshold level of the WLAN station may be set. In step 508, a priority level of WLAN signals to be transmitted by the WLAN station may be set. In step 510, scanning a plurality of access points associated with the WLAN station may begin for the set time period to acquire information of the plurality of access points. The acquired information may comprise a duration, a source address, a destination address, a basic service set ID (BSSID), a timestamp, a beacon interval, a service set ID (SSID), supported rates, frequency hopping parameters, direct sequence spread spectrum parameters, contention free (CF) parameters, independent basic service set (IBSS) parameters, and/or setup configuration protocol (SP) information of a beacon frame received from the plurality of access points. In step 512, the acquired information based on the scanning may be stored in a buffer in the WLAN station. In step 514, the power consumed by the WLAN station based on the scanning may be measured.

In step 516, it may be determined whether the power consumed by the WLAN station based on the scanning is lower than the set power threshold level of the WLAN station. If the power consumed by the WLAN station based on the scanning is higher than the set power threshold level of the WLAN station, control passes to step 520. In step 520, the scanning may be suspended for the duration of the set wait period. In step 522, one or more media packets may be transmitted and/or received for the duration of the wait period. Control then passes to step 524, where the scanning of the plurality of access points may be resumed. In instances where the power consumed by the WLAN station based on the scanning is lower than the set power threshold level of the WLAN station, control passes to step 518. In step 518, it may be determined whether the priority level of one or more media packets to be transmitted and/or received by the WLAN station is lower than a priority of a WLAN signal. In instances where the priority level of one or more media packets to be transmitted and/or received by the WLAN station is higher than a priority of a WLAN signal, control passes to step 520, where the scanning may be suspended for the duration of the wait period. In instances where the priority level of one or more media packets to be transmitted and/or received by the WLAN station is lower than a priority of a WLAN signal, control passes to step 519. In step 519, it may be determined whether the set wait period is equal to zero. If the wait period is not equal to zero, control passes to step 520. If the wait period is equal to zero, control passes to step 524. In step 524, the scanning of the plurality of access points may be resumed. Control then returns to step 510.

In accordance with an embodiment of the invention, a method and system for time based wireless local area network (WLAN) scanning may comprise a WLAN station, for example, STA 1 204 that is operable to control scanning of a plurality of wireless access points, for example, WAPs 202 and 230 in one or more wireless local area networks based on factors comprising power consumed by the WLAN station STA 1 204, based on the scanning, and/or a priority level of one or more media packets to be transmitted and/or received by the WLAN station STA 1 204. Information may be acquired for one or more of the plurality of wireless access points, for example, WAPs 202 and 230, in one or more wireless local area networks based on the controlled scanning.

The acquired information comprises one or more of a duration, a source address, a destination address, a basic service set ID (BSSID), a timestamp, a beacon interval, a service set ID (SSID), supported rates, frequency hopping parameters, direct sequence spread spectrum parameters, contention free (CF) parameters, independent basic service set (IBSS) parameters, and/or setup configuration protocol (SP) information of a beacon frame received from the plurality of wireless access points, for example, WAPs 202 and 230.

The WLAN station, STA 1 204 may be operable to suspend the scanning of the plurality of wireless access points, for example, WAPs 202 and 230, when the power consumed by the WLAN station, STA 1 204, based on the scanning is higher than a power threshold level of the WLAN station, STA 1 204. For example, if the average power consumed by the WLAN station, STA 1 204 is around 1.5 Watts, the power threshold level of the WLAN station, STA 1 204, may be set to 1 Watt. In accordance with an embodiment of the invention, the power threshold level of the WLAN station, STA 1 204, may be user programmable. Notwithstanding, the invention may not be so limited and other suitable power threshold levels may be utilized without limiting the scope of the invention. The WLAN station, STA 1 204, may be operable to resume the suspended scanning of the plurality of wireless access points, for example, WAPs 202 and 230, when the power consumed by the WLAN station, STA 1 204, based on the scanning is lower than the power threshold level of the WLAN station, STA 1 204. The WLAN station, STA 1 204 may be operable to suspend the scanning of the plurality of wireless access points, for example, WAPs 202 and 230, when the priority level of the media packets is higher than a priority level of a WLAN signal. For example, one or more audio and/or video packets to be transmitted and/or received by the WLAN station, STA 1 204, may have a higher priority level than the priority level of a WLAN signal to be transmitted and/or received by the WLAN station, STA 1 204. The WLAN station, STA 1 204 may be operable to resume the suspended scanning of the plurality of wireless access points, for example, WAPs 202 and 230, when the priority level of the one or more media packets is lower than the priority level of the WLAN signal.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for time based wireless local area network (WLAN) scanning.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus enabled for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   determining, during controlled scanning, an amount of power consumed by a wireless local area network station to perform the controlled scanning;
   in response to determining that the amount of power consumed to perform the controlled scanning exceeds a threshold, suspending said controlled scanning, without suspending media packet wireless transmission and wireless reception capability via a wireless local area network, for a wait period; and
   wirelessly transmitting or receiving one or more media packets during the wait period.

2. The method according to claim 1, comprising resuming said suspended controlled scanning when said wait period expires.

3. The method according to claim 1, comprising suspending said controlled scanning when a priority level of said one or more media packets is higher than a priority level of a wireless local area network signal.

4. The method according to claim 3, comprising resuming said suspended controlled scanning when said priority level of said one or more media packets is lower than said priority level of said wireless local area network signal.

5. The method according to claim 1, comprising acquiring information for one or more of a plurality of wireless access points in one or more wireless local area networks based on said controlled scanning.

6. The method according to claim 5, wherein said acquired information comprises one or more of: a duration, a source address, a destination address, a basic service set ID (BSSID), a timestamp, a beacon interval, a service set ID (SSID), supported rates, frequency hopping parameters, direct sequence spread spectrum parameters, contention free (CF) parameters, independent basic service set (IBSS) parameters, and/or setup configuration protocol (SP) information of a beacon frame received from a plurality of wireless access points.

7. A non-transitory computer-readable storage having stored thereon, a computer program having at least one code section for providing wireless communication, the at least one code section being executable by a computer for causing the computer to perform steps comprising:
   determining, during controlled scanning, an amount of power consumed by a wireless local area network station for the controlled scanning;

in response to determining that the amount of power consumed for the controlled scanning exceeds a threshold, suspending said controlled scanning, without suspending media packet wireless transmission and wireless reception capability via a wireless local area network, for a wait period; and wirelessly transmitting or receiving the one or more media packets during the wait period.

8. The non-transitory computer-readable storage according to claim 7, wherein said at least one code section comprises code for resuming said suspended controlled scanning when said wait period expires.

9. The non-transitory computer-readable storage according to claim 7, wherein said at least one code section comprises code for suspending said controlled scanning when a priority level of said one or more media packets is higher than a priority level of a wireless local area network signal.

10. The non-transitory computer-readable storage according to claim 9, wherein said at least one code section comprises code for resuming said suspended controlled scanning of said plurality of wireless access points when said priority level of said one or more media packets is lower than said priority level of said wireless local area network signal.

11. The non-transitory computer-readable storage according to claim 7, wherein said at least one code section comprises code for acquiring information for one or more of a plurality of wireless access points in one or more wireless local area networks based on said controlled scanning.

12. The non-transitory computer-readable storage according to claim 11, wherein said acquired information comprises one or more of: a duration, a source address, a destination address, a basic service set ID (BSSID), a timestamp, a beacon interval, a service set ID (SSID), supported rates, frequency hopping parameters, direct sequence spread spectrum parameters, contention free (CF) parameters, independent basic service set (IBSS) parameters, and/or setup configuration protocol (SP) information of a beacon frame received from a plurality of wireless access points.

13. A system for wireless communication, the system comprising:

one or more processors for use in a wireless local area network (WLAN) station, said one or more processors operable to determine, during controlled scanning, an amount of power consumed by a wireless local area network station to perform the controlled scanning; and said one or more processors operable to:

in response to determining that the amount of power consumed to perform the controlled scanning exceeds a threshold, suspend said controlled scanning, without suspending media packet wireless transmission and wireless reception capability via a wireless local area network, for a wait period; and wirelessly transmit or receive the one or more media packets during the wait period.

14. The system according to claim 13, wherein said one or more processors is operable to resume said suspended controlled scanning when said wait period expires.

15. The system according to claim 13, wherein said one or more processors is operable to suspend said controlled scanning when a priority level of said one or more media packets is higher than a priority level of a wireless local area network signal.

16. The system according to claim 15, wherein said one or more processors is operable to resume said suspended controlled scanning of said plurality of wireless access points when said priority level of said one or more media packets is lower than said priority level of said wireless local area network signal.

17. The system according to claim 13, wherein said one or more processors is operable to acquire information for one or more of a plurality of wireless access points in one or more wireless local area networks based on said controlled scanning.

18. The system according to claim 17, wherein said acquired information comprises one or more of: a duration, a source address, a destination address, a basic service set ID (BSSID), a timestamp, a beacon interval, a service set ID (SSID), supported rates, frequency hopping parameters, direct sequence spread spectrum parameters, contention free (CF) parameters, independent basic service set (IBSS) parameters, and/or setup configuration protocol (SP) information of a beacon frame received from a plurality of wireless access points.

19. The method according to claim 1, further comprising: setting a time period for scanning, the wait period, and a scanning power threshold.

20. The machine-readable storage according to claim 7, wherein said at least one code section comprises code for setting a time period for scanning, the wait period, and a scanning power threshold.

21. The system according to claim 13, wherein said one or more processors is operable to:

set a time period for scanning, the wait period, and a scanning power threshold.

* * * * *